United States Patent
Jazenski et al.

(10) Patent No.: US 7,144,630 B2
(45) Date of Patent: Dec. 5, 2006

(54) AQUEOUS ADHESIVE COMPOSITIONS FOR BONDING ELASTOMERS

(75) Inventors: Peter James Jazenski, Dayton, OH (US); Paul Anthony Dorrington, Dayton, OH (US); Dean Edward Hoy, Alexandria, OH (US); Lipa Leon Roitman, Dayton, OH (US)

(73) Assignee: Rohm and Haas Company, Philadelphia, PA (US)

( * ) Notice: Subject to any disclaimer, the term of this patent is extended or adjusted under 35 U.S.C. 154(b) by 188 days.

(21) Appl. No.: 10/349,817

(22) Filed: Jan. 23, 2003

(65) Prior Publication Data

US 2003/0158338 A1 Aug. 21, 2003

Related U.S. Application Data

(60) Provisional application No. 60/353,085, filed on Jan. 30, 2002.

(51) Int. Cl.
B32B 27/38 (2006.01)
B32B 27/32 (2006.01)
C09J 163/00 (2006.01)
C08L 63/00 (2006.01)

(52) U.S. Cl. ............ 428/416; 428/413; 428/415; 428/418; 156/330; 523/402; 525/113; 525/119; 525/121; 525/529; 525/530; 525/533

(58) Field of Classification Search ............ 523/402, 523/406; 525/121; 428/353, 354, 355 EP, 428/355 EN, 355 R, 413, 414, 421, 515, 428/519, 522
See application file for complete search history.

(56) References Cited

U.S. PATENT DOCUMENTS

| | | | |
|---|---|---|---|
| 4,167,500 A | 9/1979 | Jazenski et al. | |
| 4,308,365 A | 12/1981 | Czerwinski | |
| 4,978,409 A | 12/1990 | Fujiwara et al. | |
| 5,095,061 A * | 3/1992 | Chavez et al. | 524/376 |
| 5,268,404 A | 12/1993 | Mowrey | |
| 5,385,979 A | 1/1995 | Ozawa et al. | |
| 5,449,706 A * | 9/1995 | Iwase et al. | 523/409 |
| 5,478,654 A | 12/1995 | Hargis et al. | |
| 5,492,963 A * | 2/1996 | Ozawa et al. | 524/576 |
| 5,496,884 A * | 3/1996 | Weih et al. | 524/503 |
| 5,521,248 A | 5/1996 | Drake et al. | |
| 5,565,507 A * | 10/1996 | Marco et al. | 523/413 |
| 5,587,410 A * | 12/1996 | Kanaida et al. | 523/410 |
| 5,861,212 A * | 1/1999 | Mori et al. | 428/375 |
| 6,268,422 B1 | 7/2001 | Weih et al. | |
| 6,287,411 B1 | 9/2001 | Kelley et al. | |

FOREIGN PATENT DOCUMENTS

| | | |
|---|---|---|
| EP | 0676447 | 10/1995 |
| JP | 03-182534 | * 8/1991 |
| JP | 11-269206 | * 10/1999 |
| JP | 2001-260235 | * 9/2001 |
| JP | 2001-342446 | * 12/2001 |
| WO | WO 95/13304 | 5/1995 |
| WO | WO 99/02583 | 1/1999 |
| WO | WO 03/033613 A1 | 4/2003 |

OTHER PUBLICATIONS

Water Soluble Resins, An Industrial Guide, Second Edition, Ernest W. Flick, 1991, p. 227.*
Encyclopedia of Polymer Science and Engineering, John Wiley and Sons, 1985, vol. 3, pp. 441-460.*
Encyclopedia of Polymer Science and Engineering, John Wiley and Sons, 1987, vol. 10, pp. 395-406.*
Encyclopedia of Polymer Science and Engineering, John Wiley and Sons, 1989, vol. 17, pp. 494-498.*
Abstract of 260235/2001 (JP 2001-260235) Sep. 25, 2001.*
Abstract of 182534/1991 (JP 03-182534) Aug. 8, 1991.*
Abstract of 342446/2001 (JP 2001-342446) Dec. 14, 2001.*
Abstract of 269206/1999 (JP-11-269206) Oct. 5, 1999.*
"Enhancing Adhesion Between Dissimilar Elastomers," written and published by Sartomer Company, Inc., Exton, PA, USA, May 2001.
"Water Based Rubber to Metal Bonding Agents" (in German) by R. Wefringhaus and W. Gruber, KGK Kautschuk Gummi Kunststoffe 48, Jahrgang, Nr. Oct. 1995, pp. 729-734.
English Translation of "Water Based Rubber to Metal Bonding Agents" by R. Wefringhaus and W. Gruber, KGK Kautschuk Gummi Kunststoffe 48, Jahrgang, Nr. Oct. 1995, pp. 729-734.

* cited by examiner

Primary Examiner—Michael J. Feely
(74) Attorney, Agent, or Firm—Carl P. Hemenway

(57) ABSTRACT

The present invention relates to improved compositions for aqueous adhesives and aqueous primers that increase the durability of composites made by adhering elastomers to metal.

20 Claims, No Drawings

AQUEOUS ADHESIVE COMPOSITIONS FOR BONDING ELASTOMERS

CROSS REFERENCE TO RELATED PATENT APPLICATIONS

This is a non-provisional application of prior U.S. provisional application Ser. No. 60/353,085 filed Jan. 30, 2002.

BACKGROUND

The present invention relates to aqueous compositions useful for adhering elastomers to other substrates.

It is often desirable to bond elastomers to other materials by using adhesive compositions. Substances that are bonded to each other with one or more adhesive compositions are herein referred to as "substrates." Elastomeric materials may be desirably bonded to a variety of other materials (herein referred to as "second substrate"), including for example other elastomers, fabrics, plastics, engineering plastics, and metals.

An aqueous composition that has been used for adhering elastomers to metal involves the use of halogenated polyolefin polymer, aromatic nitroso compound, and phenolic resole, as disclosed in Mowrey, WO 9902583. Also, Kelley et. al. in U.S. Pat. No. 6,287,411 disclose the possibility of adding halogenated polyolefin, nitroso compound, and other additives to an aqueous adhesive that contains polyvinyl alcohol stabilized butadiene polymer latex formed by emulsion polymerization and that contains a so-called "methylene donor compound".

Many compositions that are useful in adhering or bonding elastomers are available dissolved in organic solvents. However, it is desirable to provide such compositions in aqueous form, to avoid the hazards and environmental effects of organic solvents as well as to improve manufacturing and applications processes. Generally, polymers that are useful as part of compositions useful in adhering elastomers are provided in aqueous form by some type of suspension or emulsification that requires the presence of surfactant to provide stability. It is believed that the surfactant remains in the composition upon drying. Thus, when the adhesive bond is put to use, the affinity of surfactants for water makes the adhesive composition tend to absorb water from its environment and thus lose some of its effectiveness as an adhesive.

The problem addressed by this invention is the provision of aqueous compositions that bond elastomers in such a way that the bonds formed have good strength when exposed to water.

STATEMENT OF THE INVENTION

In a first aspect of the present invention, there is provided an aqueous composition useful as an adhesive comprising at least one halogenated olefin polymer and at least one high-functionality epoxy resin, wherein said halogenated olefin polymer is selected from the group consisting of non-butadiene type halogenated olefin polymers produced by emulsion polymerization, non-butadiene type halogenated olefin polymers produced by methods other than emulsion polymerization, butadiene-type halogenated olefin polymers produced by methods other than emulsion polymerization, and mixtures thereof.

In a second aspect of the present invention, there is provided an aqueous composition useful as an adhesive comprising at least one halogenated olefin polymer and at least one high-functionality epoxy resin, wherein said composition is free from effective amounts of methylene-bridge compounds.

In a third aspect of the present invention, there is provided an aqueous composition useful as an adhesive comprising at least one halogenated olefin polymer, at least one high-functionality epoxy resin, and at least one water-soluble polymer containing pendant oxazoline groups.

In a fourth aspect of the present invention, there is provided an aqueous composition useful as an adhesive comprising at least one halogenated olefin polymer, at least one high-functionality epoxy resin, and at least one diacid-modified resin.

In a fifth aspect of the present invention, there is provided a composite structure comprising:
(a) an elastomer substrate,
(b) an adhesive,
(c) optionally, one or more primers, and
(d) a second substrate, wherein said adhesive is an aqueous composition comprising at least one halogenated olefin polymer and at least one high-functionality epoxy resin, wherein said halogenated olefin polymer is selected from the group consisting of non-butadiene type halogenated olefin polymers produced by emulsion polymerization, non-butadiene type halogenated olefin polymers produced by methods other than emulsion polymerization, butadiene-type halogenated olefin polymers produced by methods other than emulsion polymerization, and mixtures thereof.

DETAILED DESCRIPTION OF THE INVENTION

The use of adhesive materials to adhere or bond elastomeric substrates to other substrates is known. However, while various such adhesive compositions are known, no single formulation embodies all the characteristics that would be desirable. One such desirable characteristic, for example, is the ability to maintain adhesive or bonding properties under demanding environmental challenges, such as exposure to hot water. Another such desirable characteristic is the elimination of organic solvents. Many adhesive compositions are supplied as solutions in organic solvents, but it is desirable to improve the safety for users handling them and to reduce the negative impact on the environment by supplying the adhesives as aqueous systems.

By "aqueous," we mean that the composition is carried by water; that is, its ingredients may be dissolved, emulsified, suspended, or otherwise borne by water. In an aqueous composition, ingredients may be present in various water-borne forms, such as for example solutions, suspensions, micelles, latexes, colloids, emulsions, or other water-borne forms. In a single aqueous composition, different ingredients may be present in different forms: for example, an aqueous composition may contain dissolved substances, emulsified substances, and a latex. Further, in an aqueous composition, a single ingredient may be present in multiple forms: for example, a surfactant, if it is present, may exist in the aqueous composition as dissolved molecules, as micelles, and on the surface of latex particles. An aqueous composition may contain relatively small amounts of organic molecules such as for example cosolvents.

The elastomer substrate used in the practice of the present invention may be any of a wide variety of elastic materials. Elastomers are well known in the art. One description can be found in *Textbook of Polymer Science*, second edition, by F.

W. Billmeyer Jr., Wiley-Interscience, 1971. As described by Billmeyer, elastomers are materials that stretch under tension to a new length that is generally at least 1.1 times their original length and may be many times their original length; they exhibit relatively high strength and stiffness when stretched; after deformation, they tend to recover their original shapes relatively quickly, with relatively little residual permanent deformation. For purposes of the present invention, materials exhibiting most or all of these characteristics will be considered "elastomers." Elastomers can be made from a wide variety of materials, such as for example natural rubber and synthetic rubber. Synthetic rubbers include, for example, polybutadiene, neoprene, butyl rubber, polyisoprene, nitrile rubbers, styrene butadiene rubbers (also called SBRs), ethylene propylene diene based rubbers (some of which are called EPDM), and the like. Elastomers include both thermoplastic elastomers (also called elastoplastics or melt-processable rubbers) and crosslinked (also called vulcanized) elastomers. The present invention may be practiced to bond any elastomer. Preferred elastomers are crosslinked synthetic or natural rubbers; more preferred are crosslinked elastomers made using natural rubber. The adhesive compositions of the present invention may be used to bond elastomers to any of a wide variety of useful materials, including for example other elastomers; non-elastomeric but flexible materials such as for example fabrics or films; and rigid materials such as plastics, engineering plastics, wood, and metal. The compositions of the present invention are known to work particularly well at bonding elastomers to metal.

One class of materials used in the present invention is halogenated olefin polymers, also called halogenated polyolefins. These polymers are described by K. J. Saunders in *Organic Polymer Chemistry*, Chapman and Hall, London, 1973. Further description can be found in Weih, et. al., U.S. Pat. No. 6,268,422 (herein called "Weih"). Olefin polymers, also called polyolefins, include polymers based on monomer molecules that are unsaturated aliphatic hydrocarbons containing one double bond per molecule. Examples of such olefin polymers are polyethylene, polypropylene, polyisobutene, polybut-1-ene, poly-4-methylpent-1-ene, and the various copolymers thereof. Also included in the class of olefin polymers are polymers based on natural rubber and polymers based on synthetic rubber such as for example polyisoprene; polybutadiene; polymers of adducts of butadiene and cyclic conjugated dienes; copolymers of butadiene and styrene; copolymers of ethylene, propylene, and dienes; copolymers of acrylonitrile and butadiene; and the various copolymers thereof. Also included in the class of olefin polymers are the polymers described above that also include one or more multiply functional monomers to provide crosslinking.

Halogenated olefin polymers have structures that are the same as those of polyolefins except that halogen atoms replace one or more of the hydrogen atoms. The halogens may be chlorine, bromine, fluorine, or a mixture thereof. The preferred halogens are chlorine, bromine, and mixtures thereof. The most preferred halogen is chlorine. The amount of halogen does not appear critical and can range from 3 to 70 percent by weight of the polymer. Also included in the class of halogenated olefin polymers are the halosulfonated olefin polymers, in which some hydrogen atoms are replaced by halogen atoms and other hydrogen atoms are replaced by sulfonyl halide groups, which have the chemical formula —$SO_2X$, where X is a halogen atom. The halogens in the sulfonyl halide groups may be chlorine, bromine, fluorine, or a mixture thereof. The preferred halogens in the sulfonyl halide groups are chlorine, bromine, and mixtures thereof. The most preferred halogen in the sulfonyl halide groups is chlorine.

Suitable halogenated olefin polymers include halogen-substituted and sulfonyl halide-substituted versions of all the olefin polymers. These polymers may be made by a variety of methods known in the art. For example, the halogen atoms and/or sulfonyl halide groups may be present on the monomer before polymerization; they may be put onto the polymer after polymerization; or both methods may be used. Some examples of suitable halogenated olefin polymers include chlorinated natural rubber; polychloroprene; chlorinated polychloroprene; chlorinated polybutadiene; polymers of hexachloropentadiene; copolymers of butadiene and halogenated cyclic conjugated diene adducts; chlorinated butadiene styrene copolymers; poly(2,3-dichloro-1,3-butadiene); chlorinated ethylene propylene copolymers; chlorinated terpolymers of ethylene, propylene, and non-conjugated dienes; chlorinated polyethylene; chlorinated polypropylene; brominated polyethylene; brominated polypropylene; chlorosulfonated polyethylene; chlorosulfonated polypropylene; bromosulfonated polyethylene; bromosulfonated polypropylene; poly(2,3-dibromo-1,3-butadiene); brominated poly(2,3-dichloro-1,3-butadiene); copolymers of α-haloacrylonitriles and 2,3-dichloro-1,3-butadiene; chlorinated poly(vinyl chloride); and mixtures thereof.

The halogenated olefin polymers suitable for the practice of the present invention may be divided into two classes according to their composition: those whose monomer compositions contain substantial amounts of butadiene and/or derivatives of butadiene (herein called "butadiene-type") and those that do not (herein called "non-butadiene type"). Preferred are the non-butadiene type halogenated olefin polymers. More preferred are halogenated polyethylene, halogenated polypropylene, halogenated copolymers of ethylene and propylene, halosulfonated polyethylene, halosulfonated polypropylene, halosulfonated copolymers of ethylene and propylene, and mixtures thereof. Even more preferred are chlorinated polyethylene, sometimes called CPE, chlorosulfonated polyethylene, sometimes called CSPE, and mixtures thereof. Most preferred are mixtures of CPE and CSPE.

In the practice of the present invention, the halogenated olefin polymer can be prepared by any of a variety of methods known in the art. The method of preparation is not critical to the present invention. The halogenated olefin polymer can be either made in an aqueous form or else made in some convenient form and then converted to aqueous form. In one embodiment, a halogenated ethylenically unsaturated monomer can be polymerized or copolymerized with other monomers by aqueous emulsion polymerization; the resulting polymer may be stabilized with polyvinyl alcohol, with one or more non-polymeric surfactants, or with a combination thereof. In another embodiment, the halogenated olefin polymer is first prepared as a solution in organic solvent by methods known in the art and then converted to an aqueous latex. One method of converting the organic solution to a latex, as described by Weih, is to add surfactant and water to the solution with high shear to emulsify the polymer and then strip away the solvent. In the practice of the present invention, the preferred halogenated olefin polymers are produced by methods other than aqueous emulsion polymerization.

In the practice of the present invention, the amount of solid halogenated olefin polymer may be from 5 to 80% by weight, based on the total weight of solid materials of the adhesive composition. The amount of solid halogenated olefin polymer is preferably 10 to 60%; more preferably 15 to 50%; and most preferably 20 to 40%.

Another class of materials used in the practice of the present invention is resins herein referred to as high-functionality epoxy resins. A description of epoxy resins can be found in "Epoxy Resins" by John Gannon in the *Kirk-Othmer Encyclopedia of Chemical Technology*, fourth edition, volume 9, published by John Wiley, 1994. Those epoxy resins suitable for use in the present invention are those with a relatively high amount of epoxy functionality. Suitable resins have at least two epoxy groups per molecule. The amount of epoxy functionality can also be characterized by the resin's equivalent weight per epoxy group; higher epoxy functionality will result in a lower equivalent weight per epoxy group. Epoxy resins suitable for use in the present invention will have equivalent weight per epoxy group of 50 to 1000; preferred is 75 to 500; more preferred is 100 to 400; and most preferred is 150 to 300. Aside from the epoxy functionality, the composition of the resin is not critical to the present invention. Suitable epoxy resin compositions include, for example, epoxy phenol-novolac, epoxy cresol-novolak, diglycidyl ethers of bisphenol A, triglycidyl isocyanurate resins, N,N,N,N-tetraglycidyl-4,4-diaminodiphenylmethane, similar resins, and mixtures therof.

The amount of high-functionality epoxy resin may be from 2 to 50% by weight, based on the total weight of solid materials of the adhesive composition; preferably 3 to 40%; more preferably 4 to 30%; and most preferably 5 to 20%.

In the practice of the present invention, the high-functionality epoxy resin is provided in an aqueous form. One suitable form is an aqueous dispersion. A preferred type of dispersion is anionic. Preferred pH of the dispersion is 5 or above. Preferred particle size of the dispersion is 0.5 to 20 micron.

In the practice of the present invention, preferred high-functionality epoxy resins are epoxy cresol-novolak (ECN) resins. ECN resins are glycidylated condensates of o-cresol and formaldehyde, with the ratio of formaldehyde to o-cresol less than unity. Generally, the condensates are prepared under acidic conditions, though the method of preparation is not critical to the present invention.

Another class of materials sometimes used in the practice of the present invention is the class of diacid-modified resins. "Diacid-modified resin" herein means a resin with a pendant diacid group. "Resin" herein means any oligomer, resin, polymer, natural oil, processed natural oil, or mixture thereof. "Diacid group" herein means an organic compound with the formula

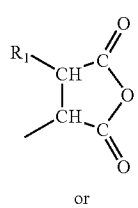

or

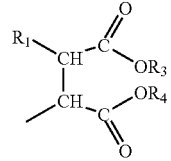

where $R_1$ is a hydrogen atom, a halogen atom, or an organic residue containing 1 to 3 carbon atoms; where $R_3$ is a hydrogen atom or an organic residue containing 1 to 20 carbon atoms; and where $R_4$ is a hydrogen atom or an organic residue containing 1 to 20 carbon atoms. The preferred $R_1$ is a hydrogen atom. The diacid group is preferably structure (I), more preferably (I) where $R_1$ is a hydrogen atom.

Some diacid-modified resins suitable for the practice of the present invention and some suitable methods of making them have been described by Otsuki, et. al. in U.S. Pat. No. 4,072,536. Generally, diacid-modified resins are made by reacting one or more resins that contain carbon-carbon double bonds with one or more diacid or diacid-derivative small molecules with carbon-carbon double bonds. Suitable diacid or diacid-derivative small molecules include, for example, maleic acid, esters and diesters of maleic acid, maleic anhydride, citraconic acid, other substituted butenedioic acids, esters and diesters of substituted butenedioic acids, citraconic anhydride, other substituted butenedioic anhydrides, and mixtures thereof.

In the practice of the present invention, some suitable resins for the resin portion of the diacid-modified resin include for example unsaturated natural oils such as linseed oil, tung oil, soybean oil, and castor oil; dehydrated unsaturated natural oils; heat-treated unsaturated natural oils; and mixtures thereof Preferred number-average molecular weight (Mn) for natural oils is 300 to 30,000.

In the practice of the present invention, preferred resins for the resin portion of the diacid-modified resin are synthetic polymers containing one or more carbon-carbon double bonds. More preferred are polymers made by polymerizing conjugated diolefins such as for example butadiene, isoprene, and mixtures thereof. Still more preferred is polybutadiene. Polybutadienes for use in the present invention can be characterized by the mole percent of monomer units that are "1,2 vinyl" units, as described in the "Sartomer Application Bulletin" entitled "Room Temperature Crosslinkable Liquid Elastomers," (herein referred to as "RTCLE") available from Atofina Corporation. Polybutadiene resins preferably have 5 to 90 mole % of 1,2 vinyl monomer units, more preferably 10 to 40 mole %.

In the practice of the present invention, preferred diacid-modified resins are polybutadienes adducted with maleic anhydride. Polybutadienes adducted with maleic anhydride have been described in the RTCLE bulletin. Polybutadienes adducted with maleic anhydride preferably have Mn of 500 to 15,000; more preferably 1,000 to 8,000, and most preferably 4,500 to 6,500. Polybutadienes adducted with maleic anhydride preferably have acid number of 40 to 150 meq KOH/g; more preferably 80 to 130 meq KOH/g; and most preferably 85 to 110 meq KOH/g.

In embodiments of the present invention that employ a diacid-modified resin, the amount of diacid-modified resin may be from 0 to 10% by weight, based on the total weight of solid materials of the adhesive composition; preferably 0.5 to 7%; more preferably 1 to 5%; and most preferably 1.5 to 4%.

Still another class of materials used in the present invention is the polynitroso compounds. Polynitroso compounds are described in Weih. A polynitroso compound is an aromatic hydrocarbon containing at least two nitroso groups attached directly to non-adjacent nuclear carbon atoms. By "nuclear" carbon atom we mean a carbon atom that is part of an aromatic ring. Suitable aromatic compounds may have 1 to 3 aromatic nuclei, including fused aromatic nuclei. Suitable polynitroso compounds may have 2 to 6 nitroso groups attached directly to non-adjacent nuclear carbon atoms. Also included in the class of polynitroso compounds are the substituted polynitroso compounds, in which one or more hydrogen atoms attached to nuclear carbon atoms are replaced by organic or inorganic substituent groups, such as for example alkyl, alkoxy, cycloalkyl, aryl, aralkyl, alkaryl, arylamine, arylnitroso, amino, and halogen. Preferred are polynitroso compounds with 2 nitroso groups.

Preferred polynitroso compounds have the chemical formula $R_m$—Ar—$(NO)_2$, where Ar is phenylene or naphthalene; R is a monovalent organic radical having 1 to 20 carbon atoms, an amino group, or a halogen; and m is 0, 1, 2, 3, or 4. If m is greater than 1, the m R groups may be the same or different from each other. R is preferably an alkyl, cycloalkyl, aryl, aralkyl, alkaryl, arylamine, or alkoxy radical with 1 to 20 carbon atoms; more preferably an alkyl, group with 1 to 8 carbon atoms. The preferred value of m is zero.

Some examples of suitable polynitroso compounds are m-dinitrosobenzene; p-dinitrosobenzene; m-dinitrosonaphthalene; p-dinitrosonaphthalene; 2,5-dinitroso-p-cymene; 2-methyl-1,4-dinitrosobenzene; 2-methyl-5-chloro- 1,4-dinitrosobenzene; 2-fluoro- 1,4-dinitrosobenzene; 2-methoxy-1,3-dinitrosobenzene; 2-benzyl-1,4-dinitrosobenzene; 2-cyclohexyl-1,4,-dinitrosobenzene; and mixtures thereof. Preferred polynitroso compounds for use in the present invention are dinitrosobenzenes, substituted dinitrosobenzenes, dinitrosonaphthalenes, substituted dinitrosonaphthalenes, and mixtures thereof.

Also included in the class of polynitroso compounds are compounds as described above which exist in polymeric form, as described in Czerwinski, U.S. Pat. No. 4,308,365, and Hargis et. al., U.S. Pat. No. 5,478,654. In the practice of the present invention, the preferred polynitroso compounds are the polymeric form of p-dinitrosobenzene, the polymeric form of 1,4-dinitrosonaphthalene, and mixtures thereof. More preferred is the polymeric form of 1,4-dinitrosobenzene.

In embodiments of the present invention that employ a polynitroso compound, the amount of polynitroso compound may be from 0.5 to 50% by weight, based on the total weight of solid materials of the adhesive composition; preferably 5 to 40%; more preferably 10 to 30%; and most preferably 14 to 22%.

In some embodiments of the present invention, one or more primers is applied to the second substrate to improve the performance of the composite. Primers may be solvent-borne or aqueous. Preferred are aqueous primers. More preferred are aqueous primers that contain at least one halogenated olefin polymer and at least one high-functionality epoxy resin. The primer(s) may also include one or more polynitroso compounds as described herein above. The resins used in the primer(s) may be the same as or different from the resins used in the adhesive. The halogenated olefin polymers suitable for use in the primers are the same as those listed herein above as suitable for the adhesive of the present invention. Preferred halogenated olefin polymers for the primer are halogenated polyisoprene, halogenated polyisoprene derivatives, and mixtures thereof; more preferred is chlorinated polyisoprene. The high-functionality epoxy resins suitable and preferred for use in the primers are the same as those listed herein above as suitable and preferred for the adhesive of the present invention.

Various additional components may be added to the adhesive composition and/or the primer composition as known in the art to improve various properties. These additional ingredients include, for example, chemicals to react with the resins to improve properties, such as morpholine and resole resins; minerals such as zinc calcium phosphate, zinc calcium phosphate modified with strontium, carbon black, silica, fumed silica, and titanium dioxide; surfactants; polymeric surfactants; dispersants; wetting agents; fillers; plasticizers; thickeners; cosolvents; preservatives; and crosslinking agents.

One ingredient that may be used in some embodiments of the present invention is a water-soluble polymer with pendant oxazoline groups. The oxazoline group has the chemical structure:

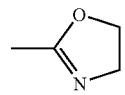

A suitable water-soluble polymer with pendant oxazoline groups is Epocros™ WS-500, available from Nippon Shokobai Co., Inc.

Another ingredient that may be used in some embodiments of the present invention is a vulcanizing agent containing selenium, tellurium, or sulfur. These three elements form a variety of compounds and alloys with each other, as disclosed by J. E. Hoffman in "Selenium and Selenium Compounds" and in "Tellurium and Tellurium Compounds," both in *Kirk-Othmer Encyclopedia of Chemical Technology*, 4th Edition, John Wiley & Sons, Inc., 1997. Sulfur, tellurium, and selenium are known as vulcanizing agents, as disclosed by Weih. Suitable vulcanizing agents in this category include, for example, sulfur, selenium, tellurium, compounds of selenium and sulfur, compounds of tellurium and sulfur, and mixtures thereof. A common compound of selenium and sulfur is selenium disulfide. Compounds of tellurium and sulfur are often referred to as "alloys." A suitable ratio of the weight of vulcanizing agent to the total weight of all halogenated olefin polymer(s) is from 1:1 to 1:30, preferably 1:1.5 to 1:10, and more preferably 1:2 to 1:5. The preferred vulcanizing agent is selenium.

In the practice of the present invention, other polymers may be added to the ingredients described above. However, it is preferred to exclude from the composition substantial amounts of inert polymers, by which we mean polymers or resins that are not any of the polymers or resins described above. In particular, it is preferred that the composition of the present invention be free from substantial amounts of polymers such as polybutadiene and other polymers that lack any of the functionalities required or preferred for the practice of the present invention, such as halogen, nitroso, epoxy, diacid modification, and oxazoline. By being free from substantial amounts of inert polymers we mean that the preferred total weight of inert polymers is less than 30% based on the total weight of halogenated olefin polymers.

More preferred is less than 20%, and most preferred is less than 10%. Smaller amounts may be used for specific purposes, such as for example small amounts of polyvinyl alcohol and/or cellulose polymers as thickeners.

In the practice of the present invention, some embodiments of the adhesive composition exclude the use of a class of compounds described by Weih as "methylene donor compounds." That is, the adhesive composition of such embodiments of the present invention is free from any amount of "methylene donor compound" or compounds that would substantially affect the behavior of the adhesive composition. These "methylene donor compounds" are thought by some practitioners to be capable of forming methylene bridges or linkages with the free hydroxyl groups of polyvinyl alcohol on the surface of latex particles of emulsion-polymerized polybutadiene polymer. Examples of so-called "methylene donor compounds" are hexamethylene tetramine, paraformaldehyde, s-trioxane, anhydroformaldehydeaniline, ethylene diamine formaldehyde, methylol derivatives of urea and formaldehyde, acetaldehyde, furfural, and methylol phenolic compounds. The so-called "methylene donor compounds" preferred in the invention of Weih are high molecular weight aldehyde homopolymers or copolymers, such as acetal homopolymers, acetal copolymers, gamma-polyoxymethylene ethers, polyoxymethylene glycols, and 2-polyoxymethylene dimethyl ether. In the practice of the present invention, such compounds are not used in the adhesive composition.

In embodiments of the present invention that exclude "methylene donor compounds", if any "methylene donor compounds" are present as, for example, impurities in other compounds, they will be present in amounts too small to be effective. That is, the amount will be too small to affect the behavior of the adhesive composition. An amount of "methylene donor compound" thought to be small enough to be non-effective is 5% or less by weight based on the total weight of solid materials of the adhesive composition. Preferably, the amount of "methylene donor compound" is 0 to 1%; more preferably 0 to 0.5%; even more preferably 0 to 0.2%, and most preferably 0 to 0.1%.

The ingredients of the present invention may be combined by a variety of means known in the art. It is preferred to mix the ingredients thoroughly. A preferred mixing element is a propeller or impeller. Preferred means of driving the mixing element is a motor. In making the adhesive of the present invention, it is preferred to add the ECN resin to a mixture containing the other ingredients. It is preferred to emulsify the chlorinated olefin polymer(s) with selected surfactants, thickeners, and other ingredients before adding other resin or polymer ingredients. Preferably, the surfactants and thickeners are chosen so that, after mixing, the emulsified chlorinated olefin polymer(s) settles to the bottom of the container, so that a layer of water can be removed, taking excess surfactant with it. It is preferred to then mix the emulsified chlorinated olefin polymer with cosolvents, more water, pigments, water soluble resins, and other ingredients, prior to addition of the ECN resin. In embodiments that employ one or more polybutadienes adducted with maleic anhydride, it is preferred to make a solution of the polybutadiene(s) adducted with maleic anhydride, surfactant, and morpholine in water and add it to the ECN resin prior to addition of the other ingredients.

In the practice of the present invention, a composite article is formed. The components include an elastomer substrate, an adhesive, optionally one or more primers, and a second substrate. The type of second substrate is not critical to the invention. Suitable second substrates include, for example, other elastomers and non-elastomer materials such as fabric, wood, metal, or plastic, including engineering plastic. If metal is the second substrate, the invention may be practiced with various grades and alloys such as for example aluminum, iron, galvanized iron, tin, nickel, steel (including stainless steel and galvanized steel), brass, and alloys thereof. Metal is the preferred second substrate. Preferred are metals with 0 to 25% magnesium by weight based on the weight of the metal; more preferred are metals with 0 to 10% magnesium, and most preferred are metals with 0 to 2% magnesium. Also preferred are metals with 50% or more of iron, based on the weight of the metal; more preferred is steel, including stainless steel, alloy steel, cold-rolled steel, soft steel, hard steel, and other types of steel; most preferred is steel with 0 to 2% magnesium.

In the practice of the present invention, when a primer is used, it may be applied by any of a variety of methods known in the art, such as for example knife coating, dip coating, spin coating, roller coating, flow coating, brush coating, coating by extrusion, drip-and-wipe coating, or spray coating. Preferred is spray coating. After applying the primer, it is preferred to heat the primer until it dries. Temperatures above 30° C. are suitable for drying the primer; preferred is 35 to 60° C. Suitable thickness of dry primer is above 0.001 mm; preferable is 0.002 to 0.03 mm; more preferable is 0.003 to 0.01 mm, and most preferable is 0.005 to 0.009 mm.

The composite may be prepared by a variety of means known in the art. The adhesive may be applied to the elastomer, which may be in a vulcanized or unvulcanized state. Preferably, the adhesive is applied to the second substrate, either directly to the second substrate or after the application of the optional primer. Suitable methods for applying the adhesive are the same as those for applying the optional primer; the method of applying the adhesive may be the same as or different from the method used for applying the optional primer. Temperatures above 30° C. are suitable for drying the adhesive; preferred is 35 to 60° C. Suitable thickness of dry adhesive is above 0.003 mm; preferable is 0.005 to 0.1 mm; more preferable is 0.01 to 0.05 mm, and most preferable is 0.015 to 0.025 mm.

In the practice of the present invention, other additional primers and/or adhesives may be included in the composite as known in the art to improve properties. In the initial assembling of the composite, the elastomer may be in a cured (also called vulcanized or crosslinked) state or in an uncured (non-vulcanized or non-crosslinked) state. After the components of the composite are brought together, the components will often be mechanically pressed together, and they will often be heated. For example, if the elastomer is in its uncured state during assembly of the layers, the composite will usually be heated prior to use. The heat and/or pressure will be chosen by the practitioner according to criteria known in the art to give the composite the best properties.

A method useful in evaluating the effectiveness of adhesive bonds is the Boiling Water Test. In this test, a square patch of adhesive, 2.54 cm×2.54 cm (1 in.×1 in.), is applied to the middle of a steel bar, 2.54 cm×7.62 cm (1 in.×3 in.). Elastomer is then molded to the entire surface of the steel bar. After the elastomer is cured, the adhesive bonds the middle portion of the elastomer to the steel, but the ends of the elastomer are unbonded. The composite is placed in a test fixture under boiling water. The test fixture clamps one end of the steel bar, and a 2 kg weight is attached to the unbonded portion of the elastomer at the other end of the steel bar. As the adhesive fails and the elastomer peels away from the steel, moving rollers adjust so that a peel angle of 90° is maintained. The time required for the elastomer to peel completely away from the steel is observed and recorded.

EXAMPLES

In conducting the examples below, some of the ingredients were first blended together to form "precursors." Then, when actually making the formulation of the example, in some cases the precursor was used directly, and in other cases further ingredients were added. The precursors were as follows:

Initial Precursor (IP)

| Ingredient | Dry Weight % | Description | Supplier |
|---|---|---|---|
| Hypalon ™ 45 | 37.29 | chlorosulfonated polyethylene | DuPont Dow Elastomers |
| Superchlon ™ HE-1200 | 55.94 | chlorinated polyethylene | Nippon Paper In. Co., Ltd. |
| Tanatex ™ Protowet ™ D75 | 0.80 | dioctyl sulfosuccinate, sodium salt | Sybron Chemicals Inc. |
| Airvol ™ 21-205 | 2.75 | polyvinyl alcohol | Air Products and Chemicals, Inc. |
| Cellosize ™ QP-100-MH | 0.15 | hydroxyethyl cellulose | Union Carbide Corporation |
| Rhodapex ™ CO-433 | 0.94 | sodium nonylphenol ether sulfate | Rhodia, Inc. |
| Abex ™ EP 120 | 2.13 | ammonium nonylphenol ether sulfate | Rhodia, Inc. |

Adhesive Precursor (AP):

| Ingredient | Dry Weight % | Description | Supplier |
|---|---|---|---|
| Water | 53.99 | — | — |
| Carboset ™ 533H | 0.618 | acrylic emulsion | B F Goodrich |
| Morpholine | 0.113 | diethylene oxime | commodity |
| Propasol ™ P | 6.386 | 1-propoxy-2-propanol | Arco Chemical |
| Dynol ™ 604 | 0.1 | wetting agent | Air Products |
| Ekaland ™ PPDN 50% HU | 8.325 | p-dinitrosobenzene | MLPC International |
| Heucophos ™ ZCP | 3.332 | modified zinc calcium phosphate | Chemarco |
| Raven H2O Black | 4.993 | carbon black | Columbian Chemicals Co. |
| Selenium | 3.994 | element | Phelps Dodge Copper Products |
| Epocros ™ WS-500 | 2.494 | oxazoline functional water soluble polymer | Nippon Shokubai Co., Inc. |
| Initial Precursor IP | 16.75 | | |

Primer Precursor (PP):

| Ingredient | Dry Weight % | Description | Supplier |
|---|---|---|---|
| Water | 70 | — | — |
| Airvol ™ 21-205 | 0.455 | polyvinyl alcohol | Air Products and Chemicals, Inc. |
| Resole ™ Resin 13165 | 3.812 | phenol-formaldehyde polymer in solution | Rutgers-Plenco |
| Carboset ™ 533H | 0.82 | acrylic emulsion | B F Goodrich |
| Propasol ™ P | 0.066 | 1-propoxy-2-propanol | Arco Chemical |
| Dynol ™ 604 | 0.007 | wetting agent | Air Products |
| Ti-Pure ™ R-900 | 5.962 | titanium dioxide | DuPont |
| Selenium | 0.873 | element | commodity |
| Hi-Sil ™ 233 | 1.091 | silicon dioxide | PPG Industries |
| Permablak ™ PX-1180 | 0.231 | carbon black | Mono-Chem Corp. |
| Pergut ™ S-20 | 15.68 | chlorinated polyisoprene | Bayer |
| Airvol ™ 21-205 | 0.636 | polyvinyl alcohol | Air Products and Chemicals, Inc. |
| Cellosize ™ QP-100-MH | 0.004 | hydroxyethyl cellulose | Union Carbide Corporation |
| Tanatex ™ Protowet ™ D75 | 0.072 | dioctyl sulfosuccinate, sodium salt | Sybron Chemicals Inc. |
| Abex ™ EP-120 | 0.288 | ammonium nonylphenolether sulfate | Rhodia, Inc. |

Example 1

Primer was prepared by adding 11.4 gram of Araldite™ ECN 1400 (ECN resin emulsion from Vantico, Inc.) to 125 gram of primer precursor PP, and the mixture was stirred for 30 minutes by a motor-driven propeller. A plate (7.6 cm×2.5 cm×0.32 cm) of cold-rolled steel treated with zinc phosphate was heated to 38–60° C. The primer was sprayed onto the plate and heated to 38–60° C. to give dry thickness of about 0.0064 mm.

A resin solution ("RS1") was prepared as follows:

| | |
|---|---|
| 42.6 gram | Ricobond ™ 1731 (1,2 polybutadiene polymer adducted with maleic anhydride, from Ricon Resins, Inc.) |
| 9.8 gram | Morpholine |
| 14.0 gram | Dowanol ™ DB |
| 87.3 gram | deionized water |

An intermediate solution ("IM1") was prepared as follows:

| | |
|---|---|
| 55.6 gram | Araldite ™ ECN-1400 |
| 44.4 gram | resin solution RS1 |

An adhesive composition was prepared as follows:

| | |
|---|---|
| 25.1 gram | Intermediate Solution IM1 |
| 244 gram | Adhesive precursor AP |

The adhesive composition was mixed with a motor-driven propeller for 30 minutes prior to use.

The primer-coated panel was heated to 38–60° C., sprayed with the adhesive composition, and dried at 38–60° C., to give a dry thickness of adhesive composition of about 0.019 mm. A natural rubber compound (durometer hardness 58 when cured) was milled on a 2-roll mill to produce samples approximately 7.9 mm to 9.5 mm thick. Coated panels were placed in a cavity; strips of milled rubber were placed into the cavity on top of the coated panels; the materials in the cavity were then compression molded at 160° C. for 8 minutes under a load sufficient to insure easy pinch-off of the resulting flashing.

Four replicated composites were prepared by this method and tested by the Boiling Water Test. The average time to failure was 5.75 hours.

Comparative A

Composites were prepared as in Example 1, except that the adhesive composition was the Adhesive Precursor AP, used without further formulation.

In the Boiling Water Test, the average time to failure was 0.6 hours. This result shows that, when the ECN and adducted polybutadiene resins are missing from the adhesive composition, the time to failure drops drastically.

Comparative B

Composites were prepared as in Comparative A, except that the primer was Primer Precursor PP, used without further formulation.

In the Boiling Water Test, the average time to failure was 0.3 hours. This result shows that, when the ECN and adducted polybutadiene resins are missing from the adhesive composition, and the ECN resin is missing from the primer, the time to failure drops even further.

Example 2

Composites were prepared as in Example 1, except that the adhesive composition used was as follows:

| | |
|---|---|
| 25 gram | ECN-1400 |
| 244 gram | Adhesive precursor AP |

The adhesive composition was mixed with a motor-driven propeller for 30 minutes prior to use.

In the Boiling Water Test, the average time to failure was 2.1 hours. This result is far superior to those of Comparatives A & B. Thus halogenated olefins (present in AP) in the adhesive composition by themselves (as in Comparatives A & B) give poor results; halogenated olefins plus ECN resin (as in Example 2) give much better results (time to failure increased by factor of 3.5 and 7 over Comparatives A & B, respectively.); and halogenated olefins plus ECN plus polybutadiene adducted with maleic anhydride (as in Example 1) give even better results (time to failure more than doubled over Example 2).

Example 3

Composites were prepared as in Example 1, except that the rubber composition was a different natural rubber compound (durometer hardness 50 when cured).

In the Boiling Water Test, the average time to failure was 3.3 hours.

Comparative C

Composites were prepared as in Example 3, except that the primer was the Primer Precursor PP, used without further formulation, and the adhesive composition was the Adhesive Precursor AP, also used without further formulation.

In the Boiling Water Test, the average time to failure was 0.1 hour, showing that removing the ECN resin from the primer and the adhesive and removing the polybutadiene adducted with maleic anhydride from the adhesive seriously degrade the durability of the laminate.

We claim:

1. An aqueous composition useful as an adhesive comprising at least one halogenated olefin polymer, at least one high-functionality epoxy resin, and at least one diacid-modified resin that is different from said halogenated olefin polymer; wherein said diacid-modified resin is made by reacting one or more resins that contain carbon-carbon double bonds with one or more diacid or diacid-derivative small molecules with carbon-carbon double bonds.

2. The composition of claim 1 wherein the amount of methylene donor compound in said composition is 0 to 0.5% by weight based on the total weight of solid materials in said composition.

3. The composition of claim 1, wherein said halogenated olefin polymer comprises at least one polymer selected from the group consisting of chlorinated polyethylene, chlorosulfonated polyethylene, and mixtures thereof.

4. The composition of claim 1, wherein said composition additionally comprises at least one moiety selected from the group consisting of selenium, tellurium, compounds of selenium end sulfur, compounds of tellurium and sulfur, and mixtures thereof.

5. The composition of claim 1, further comprising at least one water-soluble polymer containing pendant oxazoline groups.

6. The composition of claim 1, wherein said high-functionality epoxy resin comprises at least one ECN resin.

7. A composite structure comprising:
   (a) an elastomer substrate,
   (b) an adhesive,
   (c) optionally, one or more primers, and
   (d) a second substrate,
wherein said adhesive is the aqueous composition of claim 1.

8. The structure of claim 7 wherein said composite structure comprises one or more primers and wherein at least one of said primer or primers is an aqueous composition comprising at least one halogenated olefin polymer and at least one high-functionality epoxy resin.

9. The composite structure of claim 7, wherein said second substrate is selected from the group consisting of elastomers, fabric, wood, metal, and plastic.

10. The composite structure of claim 9, wherein said second substrate is metal.

11. The composition of claim 1 wherein said one or more resins that contain carbon-carbon double bonds are made by polymerizing monomers selected from the group consisting of butadiene, isoprene, and mixtures thereof.

12. The composition of claim 1 wherein said wherein said halogenated olefin polymer is selected from the group consisting of non-butadiene type halogenated olefin polymers produced by methods other than emulsion polymerization, butadiene-type halogenated olefin polymers produced by methods other than emulsion polymerization, and mixtures thereof; and wherein said composition further comprises
   (I) at least one polynitroso compound,
   (II) at least one moiety selected from the group consisting of selenium, tellurium, compounds of selenium and sulfur, compounds of tellurium and sulfur, and mixtures thereof, and (III) at least one water-soluble polymer containing pendant oxazoline groups.

13. The composition of claim 12, wherein said polynitroso compound comprises at least one dinitroso compound selected from the group consisting of dinitrosobenzenes, substituted dinitrosobenzene, dinitroso naphthalenes, substituted dinitroso naphthalenes, polymeric forms thereof, and mixtures thereof.

14. An aqueous composition useful as an adhesive comprising at least one halogenated olefin polymer, at least one high-functionality epoxy resin, and at least one diacid-modified resin, wherein said halogenated olefin polymer comprises at least one polymer selected from the group consisting of chlorinated polyethylene, chlorosulfonated polyethylene, and mixtures thereof; wherein said diacid-modified resin comprises at least one polybutadiene adducted with maleic anhydride; wherein said high-functionality epoxy resin comprises at least one ECN resin; and wherein said composition additionally comprises
   (i) at least one dinitroso compound selected from the group consisting of dinitrosobenzenes, substituted dinitrosobenzene, dinitroso naphthalenes, substituted dinitroso naphthalenes, polymeric forms thereof, and mixtures thereof,
   (ii) at least one moiety selected from the group consisting of selenium, tellurium, compounds of selenium and sulfur, compounds of tellurium and sulfur, and mixtures thereof, and
   (iii) at least one water-soluble polymer containing pendant oxazoline groups.

15. An aqueous composition useful as an adhesive comprising at least one polynitroso compound; at least one halogenated olefin polymer; and at least one high-functionality epoxy resin; wherein said halogenated olefin polymer is selected from the group consisting of chlorinated polyethylene produced by methods other than emulsion polymerization, chlorosulfonated polyethylene produced by methods other than emulsion polymerization, and mixtures thereof; and wherein said composition further comprises at least one water-soluble polymer containing pendant oxazoline groups.

16. The composition of claim 15 wherein said polynitroso compound comprises at least one dinitroso compound selected from the group consisting of dinitrosobenzenes, substituted dinitrosobenzene, dinitroso naphthalenes, substituted dinitroso naphthalenes, polymeric forms thereof, and mixtures thereof.

17. The composition of claim 15 wherein said high-functionality epoxy resin comprises at least one ECN resin.

18. The composition of claim 15, wherein said composition additionally comprises at least one moiety selected from the group consisting of selenium, tellurium, compounds of selenium and sulfur, compounds of tellurium and sulfur, and mixtures thereof.

19. The composition of claim 15, wherein said composition further comprises at least one diacid-modified resin.

20. A composite structure comprising:
   (e) an elastomer substrate,
   (f) an adhesive,
   (g) optionally, one or more primers, and
   (h) a second substrate,
wherein said adhesive is the aqueous composition of claim 15.

* * * * *